US012633750B2

(12) United States Patent
Zou et al.

(10) Patent No.: US 12,633,750 B2
(45) Date of Patent: May 19, 2026

(54) APPARATUSES AND METHODS FOR DC VOLTAGE CONTROL

(71) Applicant: GE Infrastructure Technology LLC, Greenville, SC (US)

(72) Inventors: Li Zou, Stafford (GB); Carl Barker, Stafford (GB); Amit Kumar, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/933,577

(22) Filed: Oct. 31, 2024

(65) Prior Publication Data
US 2025/0158395 A1 May 15, 2025

(30) Foreign Application Priority Data
Nov. 15, 2023 (EP) ..................................... 23210179

(51) Int. Cl.
*H02J 3/36* (2026.01)
*H02J 1/10* (2006.01)
(52) U.S. Cl.
CPC .. *H02J 3/36* (2013.01); *H02J 1/10* (2013.01)
(58) Field of Classification Search
CPC ............................... H02J 3/36; H02J 1/10–122
See application file for complete search history.

(56) References Cited

U.S. PATENT DOCUMENTS

| | | | |
|---|---|---|---|
| 8,212,412 B1 * | 7/2012 | Benedict ................... | H02J 1/10 |
| | | | 307/85 |
| 2013/0195116 A1 * | 8/2013 | Thorburn .......... | H02J 13/00002 |
| | | | 370/458 |
| 2018/0115164 A1 * | 4/2018 | Gupta ..................... | H02M 1/36 |
| 2018/0175622 A1 * | 6/2018 | Brorsson ................... | H02J 3/36 |

(Continued)

FOREIGN PATENT DOCUMENTS

| | | | | |
|---|---|---|---|---|
| CN | 108110748 A | 6/2018 | | |
| CN | 108400610 A | * 8/2018 | ............... | H02J 3/36 |
| CN | 112134270 A | 12/2020 | | |

(Continued)

OTHER PUBLICATIONS

English machine translation of CN108400610A published Aug. 14, 2018 (Year: 2018).*

(Continued)

*Primary Examiner* — Rexford N Barnie
*Assistant Examiner* — David A Shiao
(74) *Attorney, Agent, or Firm* — Eversheds Sutherland (US) LLP

(57) ABSTRACT
There is provided a method for synchronising DC voltage performed by a converter controller. The method includes receiving an indication that a synchronisation process, in which a first DC voltage controlled by the converter controller is synchronised with a second DC voltage at a DC grid, is to be initiated; in response to receiving the indication, gradually adjusting the first DC voltage up and/or down; and while gradually adjusting the first DC voltage up and/or down, determining that the synchronisation process has been successful based on a detected DC current or rate of change of DC current being greater than a predefined threshold.

10 Claims, 3 Drawing Sheets

(56)    References Cited

U.S. PATENT DOCUMENTS

2020/0203985 A1\*   6/2020   Tagawa ..................... H02J 7/34

FOREIGN PATENT DOCUMENTS

| | | | | |
|---|---|---|---|---|
| CN | 110165697 B | \* | 4/2021 | ................ H02J 3/36 |
| CN | 113346473 A | | 9/2021 | |
| EP | 3070827 A1 | | 9/2016 | |
| WO | 2013048752 A1 | | 4/2012 | |

OTHER PUBLICATIONS

English machine translation of CN110165697B published Apr. 30, 2021 (Year: 2021).\*
Extended European Search Report issued in EP Application No. 23210179.0 dated May 17, 2024, 60 pages.

\* cited by examiner

APPARATUSES AND METHODS FOR DC VOLTAGE CONTROL

TECHNICAL FIELD

This invention relates to DC power transmission and methods and apparatuses for DC power transmission.

BACKGROUND

DC power transmission systems (e.g. a High Voltage Direct Current, HVDC, power transmission system) are commonly used to transmit electrical power over long distances from the location that the power is generated (e.g. a wind farm) to an AC grid. DC power transmission systems typically include AC-DC converters for converting AC voltage/current into DC voltage/current for long distance transmission.

When a DC power transmission system comprises multiple AC-DC converters, or when it comprises a multi-terminal HVDC scheme, the DC output of any one of the multiple AC-DC converters might not necessarily be synchronised before it is connected to a common point (e.g. a DC grid, a DC bus, or a DC node) in the DC power transmission system that the DC outputs of other AC-DC converters are also connected to.

SUMMARY

According to a first aspect there is provided a method for synchronising DC voltage performed by a converter controller, the method comprising: receiving an indication that a synchronisation process, in which a first DC voltage controlled by the converter controller is synchronised with a second DC voltage at a DC grid, is to be initiated; in response to receiving the indication, gradually adjusting the first DC voltage up and/or down; and while gradually adjusting the first DC voltage up and/or down, determining that the synchronisation process has been successful based on a detected DC current or rate of change of DC current being greater than a predefined threshold.

The first DC voltage may be gradually adjusted within a pre-defined range.

The pre-defined range may correspond to a known normal operating range of the DC grid.

The gradual adjusting of the first DC voltage may comprise increasing and/or decreasing the first DC voltage in a step-wise manner.

The gradual adjusting of the first DC voltage may be performed at a predetermined rate.

The detected DC current or rate of change of DC current may correspond to a DC current flowing between an AC-DC converter controlled by the converter controller and the DC grid.

According to a second aspect, there is provided a method for synchronising DC voltage performed by a switching controller, comprising: receiving an indication that a synchronisation process, in which a first DC voltage controlled by a converter controller is synchronised with a second DC voltage at a DC grid, is to be initiated; in response to receiving the indication, monitoring a gradual adjustment of the first DC voltage; comparing the gradually adjusting first DC voltage with the second DC voltage; during the gradual adjustment of the first DC voltage, determining that the first DC voltage is synchronised with the second DC voltage based on the comparison; and in response to the determination that the first DC voltage is synchronised with the second DC voltage, electrically connecting the converter to the DC grid.

Electrically connecting the converter to the DC grid may comprise closing a switch in an electrical line between the converter and the DC grid.

The method may be performed by an apparatus remote from the converter.

According to a third aspect, there is provided an apparatus comprising: a memory; and a processor, wherein the memory comprises computer readable instructions which, when executed by the processor, causes the apparatus to perform the method according to the first aspect.

According to a fourth aspect, there is provided an apparatus comprising: a memory; and a processor, wherein the memory comprises computer readable instructions which, when executed by the processor, causes the apparatus to perform the method according to the second aspect.

According to a fifth aspect, there is provided a system comprising: the apparatus according to the third aspect; and the apparatus according to the fourth aspect.

The apparatus according to the third aspect may be located remote from the apparatus according to the fourth aspect.

The system may be a DC power transmission system.

BRIEF DESCRIPTION OF THE DRAWINGS

There now follows a brief description of preferred embodiments of the invention, by way of non-limiting example, with reference being made to the following figures in which.

DETAILED DESCRIPTION

Figure 1:
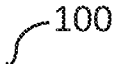
FIG. 1 shows a schematic view of a DC power transmission system.
Figure 1:
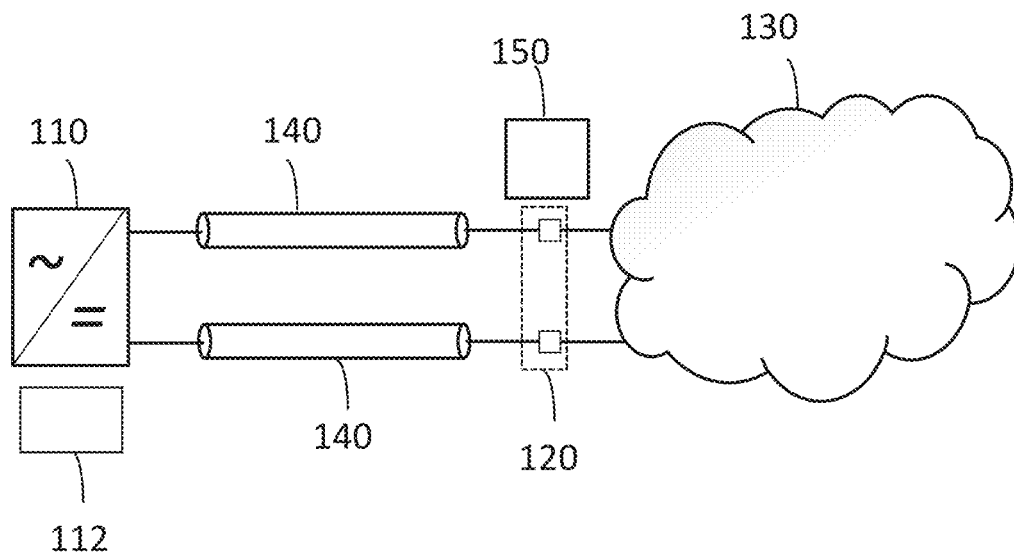

FIG. 1 shows a schematic view of a DC power transmission system 100. The DC power transmission system 100 comprises an AC-DC converter 110, an AC-DC converter controller 112, a switching apparatus 120, a DC grid 130, transmission lines 140, and a switching controller 150.

The AC-DC converter 110 is configured to convert AC voltage to DC voltage.

Although not shown, it will be appreciated that the AC-DC converter 110 receives AC voltage from elsewhere (e.g. an AC grid and/or power source such as a wind turbine). The AC-DC converter 110 is electrically connected to the DC grid via the transmission lines 140 and the switching apparatus 120. The AC-DC converter 110 comprises a built-in controller 112 which is configured to monitor and regulate/control the DC voltage output by the AC-DC converter 110. The controller 112 of the AC-DC converter 110 is also configured to perform other functions in relation to the operation of the AC-DC converter 110, some of which will be described below with reference to FIG. 2.

The switching apparatus 120 is configured to either electrically connect the AC-DC converter 110 to the DC grid 130 or electrically isolate the AD-DC converter 110 from the DC grid 130. Specifically, the switching apparatus 120 is configured to switch between a first (closed) mode and a second (open) mode. In the first mode, the switching apparatus 120 is configured to electrically connect the AC-DC converter 110 to the DC grid 130. In the second mode, the switching apparatus 120 is configured to electrically isolate the AC-DC converter 110 from the DC grid 130. The switching apparatus 120 may comprise one or more switching devices such as a DC switch and/or a HVDC circuit breaker. However, it will be appreciated that in general any type of switching device may be used provided it can fulfil the functions described above.

The DC grid 130 is configured to either receive DC power from the AC-DC converter 110 or transmit DC power to the AC-DC converter 110. In other words, the DC grid 130 is configured to exchange power with the AC-DC converter 110. The DC grid 130 may be used to deliver DC power to an end-user. It will be appreciated that the DC grid 130 itself may comprise multiple AC-DC converters. For example, the DC grid 130 may simply be a network of connected AC-DC converters.

The transmission lines 140 are configured to convey DC power from the AC-DC converter 110 to the DC grid 130, or vice versa. The transmission lines 140 may cover very large distances, e.g. several hundreds of kilometres in length. The transmission lines 140 extend between the AC-DC converter 110 and the switching apparatus 120 and thus physically separate the AC-DC converter 110 and the switching apparatus 120 by the length of the transmission lines 140, which may be several hundreds of kilometres. The transmission lines 140 may comprise transmission cables and/or any other appropriate means for conveying DC electricity.

The switching controller 150 is configured to monitor the DC voltage of the DC grid 130 and also configured to monitor the DC voltage of the transmission line side of the AC-DC converter 110 (e.g. the DC voltage of the transmission line 140 itself). Thus, even when the switching apparatus 120 is in an open mode, the switching controller 150 is configured to monitor the DC voltage on both sides of the switching apparatus 120. The switching controller 150 is further configured to control the switching apparatus 120. The switching controller 150 is located proximate to the switching apparatus 120. Thus, the switching controller 150 is physically separated (or remote from) from the AC-DC converter 110 in a similar manner to the switching apparatus 120 as described above.

Typically, during operation of the DC power transmission system 100, the DC voltage output by the AC-DC converter 110 may not be the same as the DC voltage of the DC grid 130. In other words, the DC voltage of the AC-DC converter 110 may not be synchronised with the DC voltage of the DC grid 130. This tends to be undesirable because if the AC-DC converter 110 is electrically connected to the DC grid 130 without their voltages being synchronised, then there would be a high inrush current, and it could negatively impact the stability of the DC grid 130, and/or AC-DC converters connected to DC grid 130. This may further impose undesirable and excessive electrical stress on the equipment within the AC-DC converters and DC grid.

Thus, it is desirable to synchronise the DC voltage of the AC-DC converter 110 with the DC voltage of the DC grid 130 before the AC-DC converter 110 is electrically connected to the DC grid 130. A way of synchronising the DC voltage of the AC-DC converter 110 with the DC voltage of the DC grid 130 will now be described with reference to FIG. 2.

Figure 2:
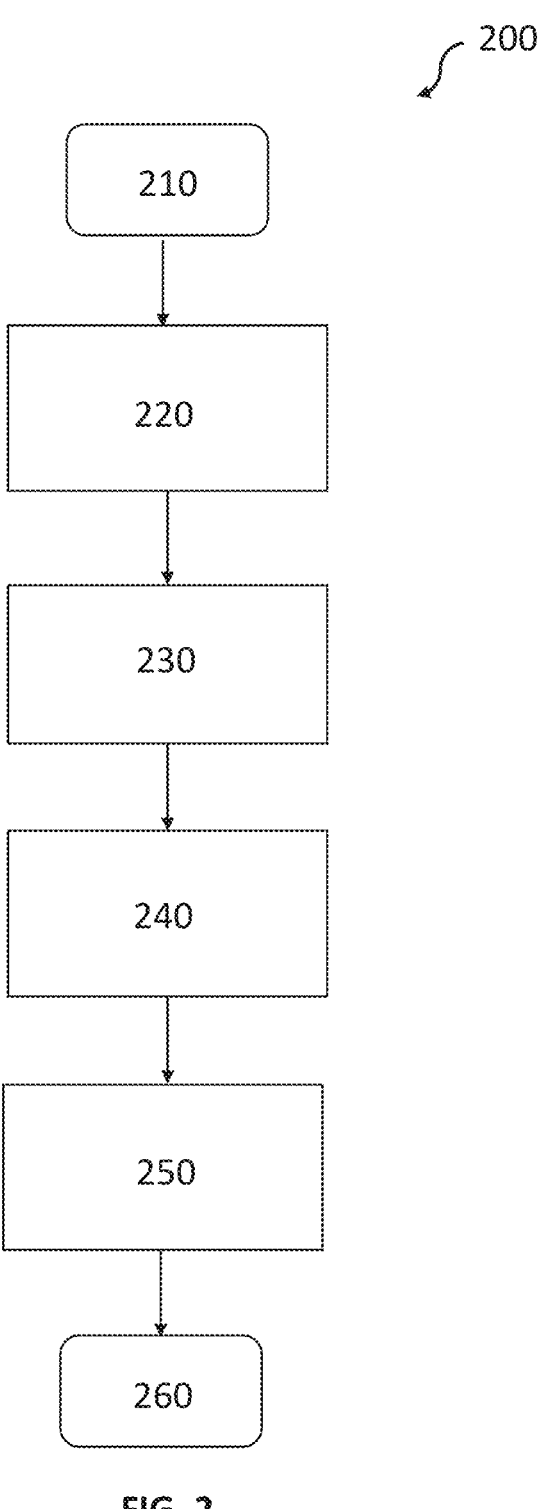
FIG. 2 shows a flowchart of a method performed by the DC power transmission system.

FIG. 2 shows a flowchart illustrating a method of synchronising the DC voltage of the AC-DC converter 110 of FIG. 1 with the DC voltage of the DC grid 130 of FIG. 1.

The following method steps will be described with reference to the elements shown in FIG. 1. At step 210, the method starts.

At step 220, a DC grid controller (not shown) or a human operator determines that a first DC voltage of the AC-DC converter 110 is to be synchronised with a second DC voltage of the DC grid 130. The first DC voltage is the voltage output by the AC-DC converter 110 which is regulated/controlled by the controller 112 of the AC-DC converter 110. In response to the determination that the first DC voltage is to be synchronised with the second DC voltage, the DC grid controller or human operator causes the AC-DC converter 110 and the switching controller 150 to initiate a synchronisation process. For example, the DC grid controller may send commands to the AC-DC converter controller 112 and the switching controller 150 to initiate the synchronisation process Alternatively, one or more human operators at the locations of the AC-DC converter controller 112 and the switching controller 150 may manually command the AC-DC converter controller 112 and the switching controller 150 to initiate the synchronisation process. In any case, the AC-DC converter controller 112 and the switching controller 150 both receive an indication that the synchronisation process is to be initiated.

At step 230, in response to the indication that the synchronisation process is to be initiated, the switching controller 150 starts monitoring the DC voltage on both sides of the switching apparatus 120 and arms the switching apparatus 120 so that the switching apparatus 120 is ready to close when synchronisation of the first DC voltage and the second DC voltage is detected.

At step 240, in response to the indication that the synchronisation process is to be initiated, the controller 112 of AC-DC converter 110 begins control of the first DC voltage. Step 240 may occur at the same time as or at a similar time to step 230. The control of the first DC voltage comprises gradually adjusting the first DC voltage within a pre-defined normal operating range of the second DC voltage (i.e. the voltage of the DC grid 130). The pre-defined normal operating range may be pre-programmed in the AC-DC converter controller 112. The pre-defined normal operating range may be based on an extreme DC voltage operating range of DC grid 130, and/or based on the DC voltage rating of the equipment within the DC grid 130 and/or based on the DC voltage rating of the AC-DC converters in the DC power transmission system 100.

The gradual adjusting of the first DC voltage may comprise gradually increasing (ramping up) and/or decreasing (ramping down) the first DC voltage within the pre-defined normal operating range of the second DC voltage. The rate at which the first DC voltage is gradually adjusted is pre-defined and pre-programmed into the AC-DC converter controller 112. The rate of the gradual adjusting may also be known to the switching controller 150 (e.g. the rate of the gradual adjusting may be communicated to the switching controller 150 before the synchronisation process is initiated in the first place, or the switching controller 150 may calculate or estimate the rate of gradual adjusting based on a measurement of the DC voltage on the transmission line 140 side of the switching apparatus 120). It will be appreciated that the gradual adjusting may be performed in many different ways and in general any appropriate ramping profile for the ramping up and/or down may be used, e.g. a linear or non-linear ramping up and/or down may be used. The gradual adjusting may be performed by changing the first DC voltage in steps, spending a defined time in each step.

At step 250, the gradual adjusting of the first DC voltage is performed until the switching controller 150 detects that synchronisation of the first DC voltage and the second DC voltage has occurred. The synchronisation of the first DC voltage and the second DC voltage may be detected when the difference between the DC voltages either side of the switching apparatus 120 is within a defined limit. For example, the defined limit for the difference may be a certain percentage of the second DC voltage (e.g. a value between 0% and 2%). More specifically, when the switching controller 150 detects that synchronisation of the first DC voltage and the second DC voltage has occurred, the switching controller 150 controls the switching apparatus 120 to switch from the second mode (open) to the first mode (closed) such that the AC-DC converter 110 is electrically connected with the DC grid 130. The switching controller 150 may issue a command to close the switching apparatus 120 at a time before the first DC voltage is synchronised with the second DC voltage. The amount of time before may be based on the rate at which the first DC voltage is gradually adjusted and/or an amount of time that it takes for the switching apparatus 120 to close. If synchronisation of the first DC voltage and second DC voltage is not detected for a pre-defined amount of time, the synchronisation operation is aborted.

The closing of the switching apparatus 120 causes a DC current to start flowing between the AC-DC converter 110 and the DC grid 130. When the controller 112 of the AC-DC converter 110 detects that the DC current or the rate of change of the DC current flowing between the AC-DC converter 110 and the DC grid 130 is greater than a pre-defined threshold (which indicates that the first DC voltage and the second DC voltage have been successfully synchronised and the switching apparatus 120 has been closed), the controller 112 of the AC-DC converter 110 causes the AC-DC converter to revert to a mode of operation in which the DC current output by the AC-DC converter 110 is zero until the converter is dispatched. In other words, when the synchronization process is complete, the AC-DC converter controller 112 sets the power output of the AC-DC converter 110 to zero until a further instruction to exchange power from an AC grid to the DC grid 130 is received by the AC-DC converter controller 112. At step 260, the method ends.

Advantageously, the above-described method allows synchronisation of the DC voltage of an AC-DC converter with a DC grid without the use of telecommunications between the AC-DC converter and a remote switching apparatus. Advantageously, the above described method allows synchronisation of the DC voltage of an AC-DC converter with a DC grid without the AC-DC converter needing to know the DC voltage of the DC grid.

Figure 3:
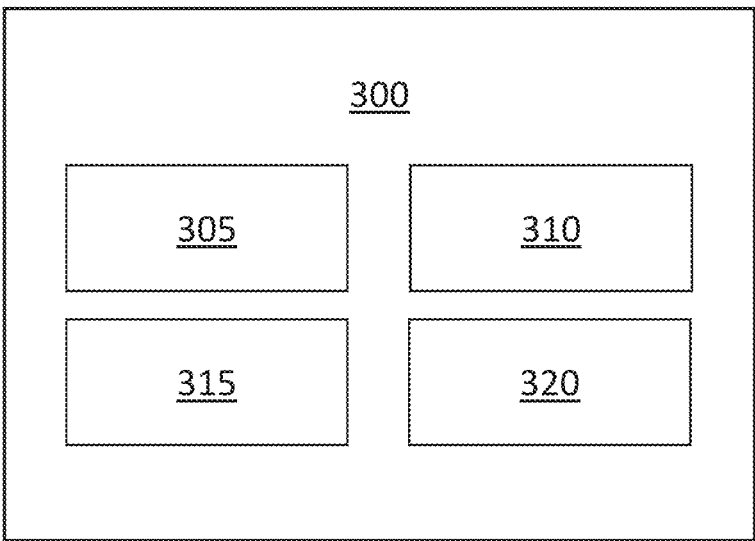
FIG. 3 shows a schematic view of a structure of a controller of the DC power transmission system.

FIG. 3 shows a schematic view of a controller 300 that may be used for implementing the methods described herein. The controller 300 may, for example, be the controller of the AC-DC converter 110 or the switching controller 150.

The controller 300 includes a processor 305, a memory 310, an input device 315, and an output device 320.

The processor 305 may include any known controller capable of executing computer-readable instructions and/or capable of performing logical operations. For example, the processor 305 may be a microcontroller, a microprocessor, a CPU, a GPU, an auxiliary processing unit, a FPGA, or similar programmable controller. The processor 305 may execute instructions stored in the memory 310 to perform the methods and routines described herein. The processor

305 is communicatively coupled to the memory 310, the input device 315, and the output device 320.

The memory 310 may be a computer readable storage medium. The memory 310 may include volatile computer storage media. For example, the memory 310 may include a RAM, including dynamic RAM ("DRAM"), synchronous dynamic RAM ("SDRAM"), and/or static RAM ("SRAM"). The memory 310 may include non-volatile computer storage media. For example, the memory 310 may include a hard disk drive, a flash memory, or any other suitable non-volatile computer storage device. The memory 310 may include both volatile and non-volatile computer storage media.

The memory 310 may store data related to wind turbine operation. For example, the memory 310 may store parameters and/or configurations and the like for controlling wind turbine operation. The memory 310 may also store program code and related data, such as an operating system or other controller algorithms operating on the controller 300.

The input device 315 is configured to receive signals from other parts of the system for use in controlling various aspects of the system. The output device 320 is configured to output signals to other parts of the system for controlling various aspects of the system.

It will be appreciated that the use of the terms "first" and "second", and the like, in this patent specification is merely intended to help distinguish between similar features (e.g. the first and second transmission conduits, and the first and second converter stations), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

We claim:

1. A method for synchronising a first DC voltage to a second DC voltage of a DC grid, performed by a converter controller, in a system having a switching apparatus between an AC-DC converter, controlled by the converter controller to output the first DC voltage, and the DC grid, the method comprising:

receiving an indication to initiate a synchronisation process, in which the first DC voltage controlled by the converter controller is to be matched with the second DC voltage;

in response to receiving the indication, gradually adjusting the first DC voltage up and/or down within a known normal operating range of the DC grid;

while gradually adjusting the first DC voltage up and/or down, determining that the synchronisation process has been successful based on a detected DC current or rate of change of DC current flowing between the AC-DC converter and the DC grid being greater than a pre-defined threshold, wherein the converter controller is not communicably coupled to the switching apparatus; and in response to detecting the DC current or rate of change of DC current is greater than the predefined threshold, controlling the AC-DC converter to revert to a mode of operation in which the DC current is zero until further instruction to exchange power with the DC grid is received by the converter controller.

2. The method of claim 1, wherein the first DC voltage is gradually adjusted within a pre-defined range.

3. The method of claim 2, wherein the pre-defined range corresponds to the known normal operating range of the DC grid.

4. The method of claim 1, wherein the gradual adjusting of the first DC voltage comprises increasing and/or decreasing the first DC voltage in a step-wise manner.

5. The method of claim 1, wherein the gradual adjusting of the first DC voltage is performed at a predetermined rate.

6. An apparatus comprising:
a memory; and
a processor, wherein the memory comprises computer readable instructions which, when executed by the processor, causes the apparatus to perform the method of claim 1.

7. A system, comprising:
a converter controller that is configured to:
   receive an indication to initiate a synchronisation process, in which a first DC voltage of an AC-DC converter is to be matched with a second DC voltage at a DC grid;
   in response to the indication, gradually adjust the first DC voltage up and/or down within a known normal operating range of the DC grid;
   while gradually adjusting the first DC voltage up and/or down, determine that the synchronisation process has been successful based on a detected DC current or rate of change of DC current flowing between the AC-DC converter and the DC grid being greater than a predefined threshold;

in response to detecting the DC current or rate of change of DC current is greater than the predefined threshold, controlling the AC-DC converter to revert to a mode of operation in which the DC current is zero until further instruction to exchange power with the DC grid is received by the converter controller; and
a switching controller configured to:
   receive a second indication to initiate the synchronisation process;
   in response to receiving the second indication, monitoring a gradual adjustment of the first DC voltage by the converter controller;
   compare the first DC voltage as it is gradually adjusted with the second DC voltage;
   during the gradual adjustment of the first DC voltage, determine that the first DC voltage is matched with the second DC voltage based on the comparison; and
   in response to the determination that the first DC voltage is matched with the second DC voltage, electrically connect the AC-DC converter to the DC grid using a switching apparatus, wherein the converter controller is not communicably coupled to the switching controller.

8. The system of claim 7, wherein the converter controller is geographically and functionally separated from the switching controller.

9. The system of claim 7, wherein the system is a DC power transmission system.

10. The system of claim 7, wherein electrically connecting the AC-DC converter to the DC grid comprises closing a switch in an electrical line between the AC-DC converter and the DC grid.

* * * * *